(12) United States Patent
Perez et al.

(10) Patent No.: US 7,595,108 B2
(45) Date of Patent: Sep. 29, 2009

(54) NANOPARTICLES COMPRISING A METAL CORE AND AN ORGANIC DOUBLE COATING USEFUL AS CATALYSTS AND DEVICE CONTAINING THE NANOPARTICLES

(75) Inventors: Henri Perez, Courcouronnes (FR); Frédéric Raynal, Paris (FR); Michel Herlem, Versailles (FR); Arnaud Etcheberry, Colombes (FR)

(73) Assignee: Commissariat a l'Energie Atomique, Paris (FR)

( * ) Notice: Subject to any disclaimer, the term of this patent is extended or adjusted under 35 U.S.C. 154(b) by 260 days.

(21) Appl. No.: 10/568,442

(22) PCT Filed: Aug. 27, 2004

(86) PCT No.: PCT/FR2004/050396

§ 371 (c)(1),
(2), (4) Date: Sep. 1, 2006

(87) PCT Pub. No.: WO2005/021154

PCT Pub. Date: Mar. 10, 2005

(65) Prior Publication Data

US 2008/0226895 A1      Sep. 18, 2008

(30) Foreign Application Priority Data

Aug. 27, 2003   (FR)   .................. 03 50460

(51) Int. Cl.
*B32B 5/16*   (2006.01)
(52) U.S. Cl. .................. 428/403; 977/773; 977/810; 977/902; 977/932

(58) Field of Classification Search ................. 428/403; 977/773, 810, 902, 932
See application file for complete search history.

(56) References Cited

U.S. PATENT DOCUMENTS 6,121,425 A * 9/2000 Hainfeld et al. .......... 530/391.5

(Continued)

FOREIGN PATENT DOCUMENTS

EP          1 112 488          7/2001

(Continued)

OTHER PUBLICATIONS

Zamborini, et al. "Synthesis, Characterization, Reactivity, and Electrochemistry of Palladium Monolayer Protected Clusters" Langmuir 2001, 17, 481-188,2001 American Chemical Socitey.

(Continued)

*Primary Examiner*—H. (Holly) T Le
(74) *Attorney, Agent, or Firm*—McKenna Long & Aldridge LLP (57) ABSTRACT

The invention relates to novel nanoparticles comprising a metal core containing at least one platinoid or an alloy of a platinoid, a first organic coating formed from molecules attached to the surface of the metal core, and a second organic coating formed from molecules different from the molecules forming the first organic coating, and which are grafted onto molecules of the first organic coating. The invention also relates to the use of the nanoparticles as catalysts. The fields of application include devices for producing electrical energy, in particular in fuel cells, devices for detecting or assaying one or more chemical or biological species, in particular in sensors or multisensors, etc.

29 Claims, 7 Drawing Sheets

U.S. PATENT DOCUMENTS

| | | | |
|---|---|---|---|
| 6,369,206 B1 * | 4/2002 | Leone et al. | 530/391.5 |
| 6,391,818 B1 | 5/2002 | Bonsel et al. | |
| 6,462,095 B1 | 10/2002 | Bonsel et al. | |
| 7,125,822 B2 * | 10/2006 | Nakano et al. | 502/339 |
| 7,252,883 B2 * | 8/2007 | Wakiya et al. | 428/403 |

FOREIGN PATENT DOCUMENTS

| | | |
|---|---|---|
| FR | 2 783 051 | 3/2000 |
| WO | WO 99/61911 | 12/1999 |

OTHER PUBLICATIONS

Templeton, et al. "Gateway Reactions to Diverse, Polyfunctional Monolayer-Protected Gold Clusters" J. Am. Chem. Soc. 1998, 120-4845-4849, 1998 American Chemical Society.

Brust, et al. "Synthesis and Reactions of Functionalised Gold Nanoparticles" J. Chem. Soc., Chem. Commun., 1995.

Perez, et al. "Synthesis and Characterization of Functionalized Plantinum Nanoparticies" Chem. Mater. 1999, 11, 3460-3463, 1999 American Chemical Society.

Maye, et al. "Core-Shell Gold Nanoparticles Assembly as Novel Electrocatalyst of Co Oxidation", Langmuir 2000, 16, 7520-7523, 2000 American Chemical Society.

Luo, et al. "Catalystic Activation of Core-Shell Assembled Gold Nanoparticles as Catalyst for Methanol Electooxidation" Catalysis Today 2790 (2002) 1-12.

Bureau, et al. "Electrochemistry As a Tool to Monitor Lewis Acid-Base Between Methacrylonitrile and Metallic Surfaces: A Theoretical and Experimental Proposal" J. Adhesion, 1996, vol. 58, pp. 101-121.

Bureau, et al. "Synthesis and Structure of Polymer/Metal Interfaces: A Covergence of Views Between Theory and Experiment" Journal of surface Analysis vol. 6 No. 2(1999).

Genies, et al. "Electrochemical Reduction of Oxygen on Plantinum Nanoparticles in Alkaline Media" Electrochimica Acta 44 (1998) 1317-1327.

Zamborini, et al. "Synthesis, Characterization, Reactivity, and Electrochemistry of Palladium Monolayer Protected Clusters" Langmuir 2001, 17, 481-188,2001 American Chemical Socitey.

Templeton, et al. "Gateway Reactions to Diverse, Polyfunctional Monolayer-Protected Gold Clusters" J. Am. Chem. Soc. 1998, 120-4845-4849, 1998 American Chemical Society.

Brust, et al. "Synthesis and Reactions of Functionalised Gold Nanoparticles" J. Chem. Soc., Chem. Commun., 1995.

Perez, et al. "Synthesis and Characterization of Functionalized Plantinum Nanoparticies" Chem. Mater. 1999, 11, 3460-3463, 1999 American Chemical Society.

Maye, et al. "Core-Shell Gold Nanoparticles Assembly as Novel Electrocatalyst of Co Oxidation", Langmuir 2000, 16, 7520-7523, 2000 American Chemical Society.

Lou, et al. "Gold-Platinum Alloy Nanoparticle Assembly As Catalyst for Methanol Electrooxidation", 2001.

Luo, et al. "Catalystic Activation of Core-Shell Assembled Gold Nanoparticles as Catalyst for Methanol Electooxidation" Catalysis Today 2790 (2002) 1-12.

Bureau, et al. "Comments on The Electroreduction of Acrylonitrile" A New Insight into the Mechanism by Martens, et al., 1997.

Bureau, et al. "Electrochemistry As a Tool to Monitor Lewis Acid-Base Between Methacrylonitrile and Metallic Surfaces: A Theoretical and Experimental Proposal" J. Adhesion, 1996, vol. 58, pp. 101-121.

Bureau, et al. "Synthesis and Structure of Polymer/Metal Interfaces: A Covergence of Views Between Theory and Experiment" Journal of Surface Analysis vol. 6 No. 2(1999).

Genies, et al. "Electrochemical Reduction of Oxygen on Plantinum Nanoparticles in Alkaline Media" Electrochimica Acta 44 (1998) 1317-1327.

* cited by examiner

NANOPARTICLES COMPRISING A METAL CORE AND AN ORGANIC DOUBLE COATING USEFUL AS CATALYSTS AND DEVICE CONTAINING THE NANOPARTICLES

This application claims priority to PCT/FR2004/050396 filed on Aug. 27, 2004, and French Application No. 03-50460 filed Aug. 27, 2003, in France, all of which are hereby incorporated by reference in their entirety.

TECHNICAL FIELD

The present invention relates to the use of nanoparticles with a metal core, more specifically based on a platinoid or an alloy of a platinoid, and an organic double coating, as catalysts.

The invention also relates to nanoparticles thus made.

The nanoparticles towards which the present invention is directed combine noteworthy catalytic and especially electrocatalytic properties with very satisfactory properties of dispersibility and stability in liquid medium.

They are therefore able to be used in any field in which catalytic processes and in particular electrocatalytic processes are involved, and especially in devices for producing electrical energy, for instance fuel cells.

Moreover, insofar as it is also possible to add, to the catalytic properties of these nanoparticles, properties of specific recognition with respect to chemical or biological species, they are also able to be used in devices for detecting or assaying chemical or biological species such as sensors or multisensors, in which the transduction and the specific interaction between the said species and the nanoparticles uses the catalytic properties of these particles.

PRIOR ART

In devices of fuel cell type, platinum, the other platinoids and alloys thereof are used, essentially in very finely divided form (nanoparticles), as anodic and cathodic catalysts, i.e. for accelerating hydrogen dissociation reactions at the anode and oxygen reduction reactions at the cathode.

Given their rarity and their cost, it is very important to optimize the functioning of catalysts of this type and to ensure that the largest possible proportion of the nanoparticles introduced into the devices are indeed participating in the electrocatalytic processes.

Added to these constraints is another that lies in the fact that the optimum functioning of the catalyst should be sufficiently durable for the device to have a sufficient service life. Specifically, in the course of functioning of the device, the nanoparticles that perform the electrocatalysis undergo migration and growth by coalescence, which are reflected by a gradual change in these nanoparticles and, as a result, a reduction in their initial catalytic performance qualities. These recurrent problems lead, in practice, to the introduction of large amounts of platinum into the devices.

The development of mineral nanoparticles coated with an organic component is extensively covered in the literature. Many publications in which mineral nanoparticles consisting of noble or non-noble metals, metal oxides or sulfides are stabilized with organic coatings to facilitate their handling in liquid medium are noted, in particular in the last ten years. Whereas the coatings initially proposed were formed from polymers or surfactants, they now increasingly consist of molecules that have a chemical function (acid, thiol, phosphate, isocyanate, etc.) allowing their attachment to the surface of the nanoparticles.

When it is a matter of exploiting the catalytic properties of metal nanoparticles, which have as their site the metal surface of these nanoparticles, the approach consisting in optimally coating them to give them long-lasting stability and to be able to handle them easily in liquid medium appears in principle to those skilled in the art to be in contradiction with the maintenance of availability of the metal surface of these nanoparticles that is the most favourable possible towards the electrocatalytic process that it is desired to exploit.

This is undoubtedly the reason why the organic coatings conventionally proposed to date for stabilizing metal nanoparticles intended to serve as catalysts are polymers that stabilize these nanoparticles essentially by means of steric effects, for instance polyvinyl alcohol, polyacrylic acid and poly(n-vinylpyrrolidone). The chemical bonds that attach these polymers to the metal surface of the nanoparticles are neither numerous nor very strong, and as such they can be destroyed by the media suitable for the expression of electrochemical phenomena and which are characterized by very acidic pH values or, on the contrary, very basic pH values and by high ionic strengths. Such destruction is quite obviously reflected by the loss of the initially desired stabilizing effect.

Organic coatings consisting of ionic or neutral surfactants are also known. The surfactant molecules must be long enough to have a stabilizing effect and contain chains of methylene groups ($-CH_2$)$_n$ that are in principle poorly suited to the transfer of electronic or ionic charges involved in electrocatalytic processes. Furthermore, in this case also, the chemical bonds that attach the surfactant molecules to the metal surface of the nanoparticles are relatively weak and thus sensitive to the particular pH and ionic strength conditions of the media used in electrochemistry.

Moreover, certain authors have recommended the use of stabilizing polymers or copolymers comprising chemical groups capable of improving the transfer of charges or mass involved in electrocatalytic processes, and especially for applications to fuel cells. Thus, for example, U.S. Pat. No. 6,462,095 [1] describes platinum nanoparticles stabilized with a cation-exchange polymer or copolymer of the sulfonated polyaryl ether ketone, sulfonated polyether sulfone, sulfonated poly(acrylo-nitrile/butadiene/styrene) or poly (α,β,γ-trifluoro-styrene/sulfonic acid) type.

Finally, still in the context of electrocatalysis, stabilizing molecules capable of forming strong interactions with the metal surface of nanoparticles have been proposed. This is a case of molecules bearing thiol functions that establish ionic-covalent bonds with many metals. Interactions of this type lead to high degrees of coverage of the nanoparticles, which leaves little metal surface available for electrocatalytic processes. Thus, for example, the gold nanoparticles stabilized with alkylthiolates described by Maye et al. in *Langmuir*, 2000, 16, 7520-7523, [2], and by Lou et al. in *Chem. Commun.*, 2001, 473-474, [3], show electrochemical activity only after an activation treatment. This activation treatment, which is performed under conditions of strong electrochemical oxidation, imposes, firstly, the removal of the organic stabilizing coating and, secondly, a change in the characteristics of the metal surface of the nanoparticles, as reported by Luo et al. in *Catalysis Today*, 2000, 2790, 1-12, [4], which may prove to be problematic under the conditions of use of these nanoparticles as catalysts in a device. Specifically, as regards, for example, the removal of the organic stabilizing coating, there is a serious risk of this removal leading to phenomena of migration of the nanoparticles, which would be of a nature to reduce their catalytic performance qualities over time and furthermore to make them difficult to recover during the phase of recycling of the device at the end of its service life.

The problem consequently arises of providing catalysts consisting of nanoparticles based on platinum, another platinoid or an alloy thereof, which, while having optimum catalytic properties, are readily dispersible and stable in liquid medium, in a long-lasting manner and such that, firstly, they are easy to handle once in suspension, and, secondly, the durability of their catalytic performance qualities is ensured.

In the French patent application published under the number 2 783 051 [5], a team of research scientists including one of the inventors of the present invention described the use of nanoparticles consisting of a metal core, which may especially be platinum, of a first crown formed from organic molecules attached to this core and of a second crown formed from organic molecules, different from the preceding molecules and grafted onto the molecules of the first crown, in the form of thin films for the detection of chemical species, and also chemical sensors including such films as sensitive layers. In the said patent application, the second organic crown of the nanoparticles ensures the selective interaction properties of the thin films with the chemical species to be detected; the metal core of the nanoparticles allows the possibility of measuring a variation in electrical conductivity of the thin films, whereas the first organic crown serves essentially to attach the second organic crown to the said metal core.

Now, in the context of their studies, the inventors have found that, against all expectation, nanoparticles comprising, like those described in reference [5], a platinum core and an organic double coating, have noteworthy catalytic properties, and in particular electrocatalytic properties, without it being necessary to subject them to any activation treatment. The inventors have also found that these nanoparticles have very satisfactory properties in terms of dispersibility, stability in liquid medium and resistance to the very acidic or very basic media and media with high ionic strengths conventionally used in the field of electrochemistry.

This finding forms the basis of the present invention.

DESCRIPTION OF THE INVENTION

A subject of the invention is thus, firstly, the use of nanoparticles comprising:
  a metal core containing at least one platinoid or an alloy of a platinoid,
  a first organic coating formed from molecules attached to the surface of the metal core, and
  a second organic coating formed from molecules different from the molecules of the first organic coating, and which are grafted onto molecules of the first organic coating, as catalysts.

In the text hereinabove and hereinbelow, the term "platinoid" means a metal chosen from platinum, iridium, palladium, ruthenium and osmium, and the term "alloy of a platinoid" means an alloy comprising at least one platinoid, this alloy possibly being natural, for instance osmiridium (natural alloy of iridium and osmium) or unnatural, for instance an alloy of platinum and iron, of platinum and cobalt or of platinum and nickel.

Preferably, the metal core of the nanoparticles consists of platinum or a platinum alloy or a mixture of the two.

In the use in accordance with the invention, the molecules of the first organic coating serve mainly to allow the grafting of the molecules of the second organic coating, whereas the molecules of the second organic coating provide a significant improvement in the stability of the nanoparticles in suspension in a liquid medium, the two coatings needing to allow the phenomena of transportation of charges and of matter and also the accessibility of the surface of the metal core, required for the expression of the catalytic properties of the nanoparticles.

In accordance with the invention, the molecules of the first organic coating are preferably attached to the surface of the metal core via a chemical bond of strong covalent nature, i.e. a covalent or ionic-covalent bond.

As a result, according to a first preferred arrangement of the invention, the molecules of the first organic coating, which are preferably identical to each other for the same particle, are residues of at least difunctional compounds, i.e. of compounds that contain at least two free chemical functions: a first function referred to hereinbelow as "function F1" capable of forming a chemical bond of strong covalent nature with the surface of the metal core to allow their attachment to this surface, and a second function referred to hereinbelow as "function F2" capable of reacting with at least one function borne by the compounds chosen to form the molecules of the second organic coating to allow them to be grafted with the said molecules.

In corollary, the molecules of the second organic coating, which are also preferably identical to each other for the same particle, are residues of compounds that comprise at least one free chemical function referred to hereinbelow as "function F3", which is capable of reacting with the function F2 of the abovementioned difunctional compound.

In the text hereinabove and hereinbelow, the term "residues of compounds" means the part of these compounds that remains on the nanoparticles when they are:
  either attached to the surface of the metal core and, optionally, grafted with a molecule of the second organic coating, if they are residues forming the first organic coating;
  or grafted onto a molecule of the first organic coating, if they are residues forming the second organic coating.

In accordance with the invention, the formation of a covalent or ionic-covalent chemical bond between the function F1 of the at least difunctional compounds chosen to form the molecules of the first organic coating and the surface of the metal core may be obtained via any of the processes used in the prior art for establishing bonds of this type between an organic compound and a metal.

Thus, for example, it may be obtained by synthesizing the nanoparticles via reduction of a metal salt corresponding to the metal needing to constitute the core by means of the said at least difunctional compounds. As a variant, it may also be obtained by replacing, on nanoparticles formed from a metal core coated with a labile compound, this compound with the at least difunctional compounds.

The reaction between the function F2 of the at least difunctional compounds and the function F3 of the compounds chosen to form the molecules of the second organic coating—which will be denoted for simplicity hereinbelow as the "grafting reaction"—may itself be any organic chemistry reaction that allows two organic compounds to be bonded together, via any type of bonding, preferentially covalent bonding, by means of their respective chemical functions.

According to another preferred arrangement of the invention, the molecules of the first organic coating of the nanoparticles are capable of degrading at the surface of the metal core when they are not grafted with molecules of the second organic coating. This degradability either may be spontaneous, i.e. intrinsically associated with the nature of the molecules used, or may result from a treatment of the nanoparticles, for example using a suitable reagent, it being understood that this treatment should not result in degradation of the molecules forming the second organic coating.

4-Mercaptoaniline, which simultaneously has the property of being difunctional, since it comprises a thiol function and an amine function in the para position of a phenyl group, and that of degrading spontaneously, represents an example of a compound that is particularly suitable for preparing the first organic coating.

According to yet another preferred arrangement of the invention, the molecules of the second organic coating are grafted onto the molecules of the first organic coating via a grafting reaction after which the degree of grafting of the said molecules of the first organic coating, i.e. the proportion of these molecules onto which are grafted the molecules of the second organic coating, is less than 100%. As a result, the nanoparticles obtained after the grafting reaction have a first organic coating in which certain molecules are not grafted with molecules of the second organic coating.

Figure 1:
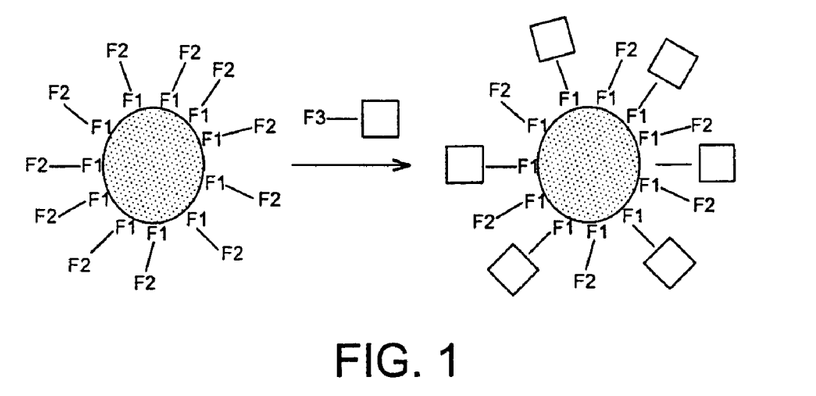
FIG. 1, which has already been discussed, schematically shows a nanoparticle before and after a grafting reaction.

This is illustrated in FIG. 1, which schematically shows a nanoparticle before and after a grafting reaction performed in accordance with the invention, and in which:

each F1-F2 represents a molecule of the first organic coating not grafted with a molecule of the second organic coating;

F3-□ represents a compound chosen to form the molecules of the second organic coating; whereas each F1-□ represents a molecule of the first organic coating grafted with a molecule of the second organic coating.

This last preferred arrangement would make it possible, in conjunction with the use of compounds capable of spontaneous or induced degradation to form the first organic coating, to ensure accessibility of the surface of the metal core of the nanoparticles. Specifically, degradation of the molecules of the first organic coating, which have not been grafted with molecules of the second organic coating during the grafting reaction, should rapidly lead to the removal of these molecules from the surface of the metal core and, as a result, to the release of the zones previously occupied thereby, which would thus become accessible.

In accordance with the invention, the degree of grafting of the molecules of the first organic coating may be modified by varying the respective amounts of nanoparticles and of compounds chosen to form the molecules of the second organic coating that are reacted during the grafting reaction.

However, this way of proceeding is not the way preferred in the context of the present invention since it entails the risk of excessively partial grafting of the nanoparticles, which is in turn liable to lead, taking into account the degradation of the molecules of the first organic coating, to insufficient or even no dispersibility of the nanoparticles in liquid medium and to instability of the suspensions prepared with these nanoparticles.

Thus, according to the invention, it is preferred to modify this degree of grafting by varying the geometrical characteristics of the compounds chosen to form the molecules of the second organic coating, and especially by varying the steric hindrance generated by these molecules.

According to yet another preferred arrangement of the invention, the molecules of the second organic coating are the residues of compounds which, while possibly being of very varied nature (oligomers, polymers, etc.), are capable of:

giving the nanoparticles properties of dispersibility, stability in liquid medium and resistance to the media conventionally used in the field of electrochemistry, and doing so in a long-lasting manner to avoid any phenomenon of aggregation and migration of these nanoparticles in the short, medium or long term, especially when they are involved in electrochemical processes;

preserving the accessibility of the surface of the core of the nanoparticles;

dispensing with a treatment for preactivation of the nanoparticles; and optionally optimizing the transfer of charges (electronic and ionic charges) and of mass, when the nanoparticles are intended to be used in applications involving such transfers (for example fuel cells).

In particular, these molecules are residues of compounds that have one or more of the following properties:

1. they are capable of preserving the electron transfers from one nanoparticle to another. To do this, these compounds must have the smallest possible number of saturated C—C bonds, since these are unfavourable to electron transfers, and must avoid leading to an excessively large increase in the thickness formed by the two organic coatings, since the probability of electron transfer decreases rapidly as the distance increases. In this regard, it is preferable for the thickness formed by the two organic coatings not to exceed about ten nanometres. As examples of compounds capable of preserving electron transfers, mention may be made of polycyclic compounds, and especially polycyclic anhydrides, for instance tetraphenylphthalic anhydride, diphenic anhydride or diphenylmaleic anhydride.

2. they should have structural characteristics that allow a minimum degree of grafting to be obtained while at the same time giving the nanoparticles satisfactory properties in terms of dispersibility and stability in liquid medium. These compounds may especially be small compounds that have a certain level of rigidity by means of the presence of aromatic rings and in which the function F3 is positioned such that the major axis of the molecules of the second organic coating, once grafted onto the molecules of the first coating, is oriented perpendicularly rather than parallel to the axis of the covalent bond formed between the said function F3 and the function F2 of the molecules of the first organic coating. Examples of such compounds are poly-para-phenylenes substituted with at least one function to graft them onto the molecules of the first organic coating.

3. they comprise one or more ionizable functional groups capable of relaying and thus of permitting the transfer of ionic species. Such compounds are, for example, cyclic anhydrides, for instance glutaric anhydride, which may optionally be perfluorinated beforehand to exacerbate the ionizable nature of the said functional group(s).

4. they have inherent characteristics that are favourable, in terms of chemical affinity, towards promoting the combination of the nanoparticles with a particular support, chosen as a function of the use for which they are intended. Thus, for example, these compounds may be more or less hydrophilic or hydrophobic depending on whether the support will itself be hydrophilic or hydrophobic, or may comprise a polymerizable or copolymerizable species, for instance a thiophene or a pyrrole.

5. they show properties of specific recognition towards one or more chemical or biological species (amino acid, protein, sugar, DNA or RNA fragment, etc.) when the nanoparticles are intended to be used in detection and assaying systems, and especially in sensors or multisensors.

Preferably, the molecules of the second organic coating are residues of compounds chosen from thiophenes comprising at least one function for grafting them onto the molecules of the first organic coating, and monocyclic or polycyclic anhydrides.

In a particularly preferred manner, the molecules forming the second organic coating are residues of compounds chosen from thiophene acid chloride, glutaric anhydride, sulfobenzoic anhydride, diphenic anhydride, tetrafluorophthalic anhydride, tetraphenylphthalic anhydride and diphenylmaleic anhydride.

According to yet another preferred arrangement of the invention, the nanoparticles are from about 1.5 to 10 nm in diameter and preferably from about 1.5 to 5 nm in diameter.

Given their dispersibility and stability properties in liquid medium, the nanoparticles that are useful according to the invention may be stored before use and/or may be used in suspension in a solvent suitably chosen as a function of the degree of polarity of the molecules forming the second organic coating. The solvent used for this purpose is generally a polar aprotic solvent such as dimethyl sulfoxide, dimethylformamide or dimethylacetamide, but it may also be an apolar solvent such as chloroform or dichloromethane, if it is found that the nanoparticles are not dispersible in a polar aprotic solvent.

In particular, the nanoparticles may be stored before use in the form of suspensions, with concentrations of about from 0.3 to 1 mg/ml, which are then diluted as a function of the use for which these nanoparticles are intended.

Using these suspensions, it is possible to prepare thin films, formed from one or more layers of nanoparticles, by deposition on supports of very varied nature and characteristics. Specifically, these supports may be electrical insulators, ionic conductors, conductors or semiconductors; they may consist of a wide variety of materials (metal, glass, carbon, plastic, textile, etc.) and may be either in finely divided form or in bulk form. In addition, they may be equipped with electrodes.

These thin films may be prepared via any technique known to those skilled in the art for the manufacture of such films, for instance the Langmuir-Blodgett technique, the sequential deposition of self-assembled layers, spontaneous adsorption by chemical or electrochemical grafting, spin coating, deposition by surface impregnation, electrodeposition or electrografting, the mechanism of which has been described by Bureau et al. in *Macromolecules,* 1997, 30, 333 [6] and in *Journal of Adhesion,* 1996, 58, 101 [7] and also by Bureau and Delhalle in *Journal of Surface Analysis,* 1999, 6(2), 159 [8].

The Langmuir-Blodgett technique, which has been widely described in the literature, is, for example, well suited to the deposition of nanoparticles, monolayer by monolayer, onto rigid supports, whereas surface impregnation is more suited, for example, to the deposition of nanoparticles onto flexible supports such as textile supports.

For the purposes of the present invention, the term "monolayer" means a layer whose thickness does not exceed the diameter of a nanoparticle when it is likened to a sphere.

The flexibility afforded by the approach used according to the invention, which consists in grafting a second organic coating, the characteristics of which such as the density and the polarity may be controlled, makes it possible to promote the combination of the nanoparticles with a support having particular surface characteristics.

Thus, combining the nanoparticles with carbon nanotubes appears to be of most particular interest in certain electrochemical applications such as the production of electrical energy in fuel cells. The reason for this is that coating carbon nanotubes, which are hydrophobic or which have been rendered hydrophilic, with nanoparticles should allow the functioning of cells of this type to be considerably improved by intimately assembling, at the nanometric scale, an electron conductor and a catalyst.

The nanoparticles as described above have many advantages as catalysts.

Specifically, although these nanoparticles have an organic double coating, they reveal highly advantageous catalytic properties and in particular show very high electrocatalytic activity towards the reduction of oxygen and the oxidation of hydrogen.

This is likewise the case for materials prepared using these nanoparticles. Thus, for example, the bulk activities measured for monolayers of nanoparticles in accordance with the invention according to the same methodology and under the same experimental conditions as those described by Geniès et al. in *Electrochimica Acta,* 1998, 44, 1317-1327 [9], may be up to 500 A/g of platinum, i.e. a value 5 times greater than the best results obtained (89.6 A/g of platinum) for a powder formed from platinum dispersed on carbon and introduced into polytetrafluoroethylene [9].

Another advantage of the nanoparticles lies in the fact that, if the molecules forming their second organic coating are suitably selected, their catalytic properties are presented without it being necessary to subject them beforehand to any activation treatment. In other words, they are immediately active.

This being the case, when nanoparticles, although spontaneously active, appear not to have optimum performance qualities in acidic medium, it is found that it is possible to very significantly improve their performance qualities by subjecting them beforehand to a treatment in basic medium, which may especially consist in immersing the nanoparticles, which are optionally already in the form of a film, in a solution of a strong base such as a 1M sodium hydroxide solution for several minutes, or even for several tens of minutes.

Moreover, the nanoparticles also prove to have noteworthy properties in terms of dispersibility, stability in liquid medium and resistance to very acidic or very basic media and media of high ionic strength.

As a result, these nanoparticles are particularly easy to handle and, above all, their catalysis properties are very stable over time. Thus, the nanoparticles may be stored or used for several years in liquid media without any risk of degradation of their catalytic performance qualities.

Furthermore, they offer the advantage of being able to be perfectly adapted to the use for which they are intended. Specifically, by suitably selecting the compounds intended to form the two organic coatings of the nanoparticles, and in particular that intended to form the second organic coating, it is possible to modify and thus optimize some of their properties with a view to a particular use, for instance their capacity to preserve the transfer of electronic charges or of ionic species, their affinity towards a support, their aptitude towards electrodeposition or their ability to specifically recognize one or more chemical or biological species and to interact therewith.

Finally, they have the additional advantage of being able to be manufactured via processes that are simple to perform, using standard techniques of organic chemistry, and at costs that are compatible with industrial exploitation.

Taking the foregoing arguments into account, the use of nanoparticles as electrocatalysts is of most particular interest in devices for producing electrical energy, and especially in fuel cells.

A subject of the present invention is thus also a device for producing electrical energy, which comprises nanoparticles as defined above.

In accordance with the invention, this device is preferably a fuel cell.

The use of the nanoparticles as catalysts is also of great interest in the field of detecting and assaying chemical or biological species, especially in solution, and in particular in sensors or multisensors.

In this case, the molecules forming the second organic coating are chosen so as to specifically recognize the chemical or biological species that is (are) to be detected or assayed and to interact therewith.

Either, the specific interaction between the molecules of the second organic coating and this or these species generates a secondary species towards which the nanoparticles have catalytic activity, for example $H_2O_2$ or any other redox probe, in which case it is possible to measure, by applying a suitable potential, a current proportional to the amount of secondary species produced and, thereby, an electrical signal that reflects the degree of the specific interaction.

Or, the specific interaction between the molecules forming the second organic coating and the said species does not generate a redox probe, in which case the said probe may be introduced into the medium containing the species that it is desired to detect or assay. The specific interaction between the molecules of the second organic coating and the said species is then reflected by a change in the current associated with the catalytic activity of the nanoparticles towards the redox probe thus introduced into the medium.

Among the nanoparticles whose use as catalysts has been described hereinabove, some have already been described in the literature. Such is the case for nanoparticles with a platinum core, comprising a first organic coating formed from 4-mercaptoaniline residues and a second organic coating formed from thiophene acid chloride residues, which are known from reference [5].

On the other hand, others have, to the Inventors' knowledge, never been proposed to date, for instance those whose second organic coating is formed from residues of monocyclic or polycyclic anhydride molecules.

A subject of the invention is thus also a nanoparticle that comprises a metal core containing at least one platinoid or an alloy of a platinoid, a first organic coating formed from molecules attached to the surface of the metal core and a second organic coating formed from molecules different from the molecules forming the first organic coating, and which are grafted onto the molecules of the first organic coating, and in which the molecules forming the second organic coating are residues of a compound chosen from monocyclic and polycyclic anhydrides.

According to one preferred arrangement of the invention, the molecules forming the second organic coating of this nanoparticle are residues of a compound chosen from glutaric anhydride, sulfobenzoic anhydride, diphenic anhydride, tetrafluorophthalic anhydride, tetraphenylphthalic anhydride and diphenylmaleic anhydride.

According to another preferred embodiment of the invention, the metal core of this nanoparticle consists of platinum, a platinum alloy or a mixture of the two, whereas, according to yet another preferred arrangement of the invention, the molecules forming the first organic coating are 4-mercaptoaniline residues.

Other characteristics and advantages of the invention will emerge more clearly on reading the rest of the description that follows, which relates to examples for the preparation of nanoparticles that are useful in accordance with the invention and for demonstration of their properties, and which refers to the attached drawings.

Needless to say, these examples are given merely as illustrations of the subject of the invention and do not in any way constitute a limitation of this subject.

For convenience, the term "functionalized nanoparticle" serves to denote hereinbelow a nanoparticle comprising, on the metal core, only a first organic coating, whereas the term "grafted nanoparticle" serves to denote a nanoparticle that additionally comprises a second organic coating following the grafting of molecules onto the molecules of the said first coating.

EXAMPLES

Example 1

Preparation of Functionalized Nanoparticles

Nanoparticles comprising a platinum core and a first organic coating resulting from the attachment of 4-mercaptoaniline molecules to the core are prepared by following the procedure below.

Three solutions, referred to hereinbelow as solution 1, solution 2 and solution 3, are first prepared.

Solution 1 is obtained by dissolving 300 mg of platinum tetrachloride in 75 ml of hexylamine. It is orange-coloured.

Solution 2 is obtained by dissolving 300 mg of sodium borohydride in 40 ml of a water/methanol mixture (50/50), followed, after total dissolution of the sodium borohydride, by addition of 20 ml of hexylamine.

Solution 3 is obtained by dissolving 330 mg of 4-mercaptoaniline disulfide in 30 ml of a methanol/ hexylamine mixture (50/50).

At t=0, solution 2 is mixed with solution 1 with vigorous stirring. The mixture turns dark brown within a few seconds.

At t=20-60 seconds, solution 3 is added to the above mixture, and at t=250 seconds, 200 ml of water are introduced into the reaction medium.

At t=15 minutes, this reaction medium is transferred into a separating funnel. The organic phase is isolated and washed three times with 200 ml of pure water.

The organic phase is then reduced on a rotavapor at a temperature of about 35° C. down to a volume of about 3 to 4 ml. It is then transferred into a centrifuge tube containing 300 mg of 4-mercaptoaniline disulfide dissolved in 15 ml of ethanol, and left stirring overnight before being centrifuged. The supernatant, which contains an excess of 4-mercaptoaniline disulfide, is removed and the black precipitate remaining at the bottom of the tube is washed with 30 ml of an ethanol/ diethyl ether mixture (33/66 v/v) for 2 minutes and then centrifuged again. The supernatant is removed. The black precipitate is washed with diethyl ether and then dried for 10 to 15 minutes under a flow of nitrogen. The resulting powder has a mass proportion of 20% for the organic part and 80% for the platinum.

Example 2

Preparation of Grafted Nanoparticles

Grafted nanoparticles are prepared by subjecting functionalized nanoparticles in accordance with Example 1 and freshly prepared (given the tendency of 4-mercaptoaniline to degrade spontaneously) to one of the grafting reactions illustrated in FIGS. 2A to 2G.

These reactions are all performed in the presence of a large excess of compound to be grafted relative to the amount of amine functions borne by the functionalized nanoparticles. To do this, given that 20% of the mass of the functionalized nanoparticles corresponds to the mercaptoaniline residues attached (in the form of thiolates) to the platinum core, and given that the mercaptoaniline has a molar mass of 124 g, the number of moles of compound to be grafted that need to be used in order for there to be an excess thereof, for example of 5 to 10, relative to the number of moles of mercaptoaniline residues attached to the functionalized nanoparticles and, as a result, to the number of amine functions borne thereby, is calculated.

The solvents are dried beforehand over molecular sieves and are used in volumes appropriate to obtain concentrations of functionalized nanoparticles of about from 4 to 10 mg per $cm^3$.

In general, the grafting reactions are performed as follows. To begin with, the functionalized nanoparticles are dispersed in a volume of a suitable solvent and the suspension obtained is stirred magnetically under nitrogen for about 15 minutes. The compound to be grafted is then introduced directly into this suspension, optionally with a compound capable of trapping the by-products of the grafting reaction.

The reaction medium is stirred for 12 hours under nitrogen and then transferred into a centrifuge tube to which is added a large excess of a solvent intended to cause the precipitation of the nanoparticles. Once this has been produced, the reaction medium is centrifuged and the supernatant, which usually contains a large proportion of the excess of grafting molecules used in the reaction, is discarded.

The nanoparticle precipitate is then washed and centrifuged one to four times in a solvent capable of dissolving the molecules of the grafting compound which, although unreacted, are liable to remain with the nanoparticles, without, however, dispersing them. It is occasionally necessary to use a mixture of solvents to wash the precipitate or to redisperse the nanoparticles and to make them precipitate again. Finally, in certain cases, the solvent used for the reaction should be evaporated off under vacuum before washing the precipitate.

The powder of grafted nanoparticles thus obtained is dried under vacuum or under nitrogen. It may then be used to prepare suspensions of grafted nanoparticles of desired concentrations, in general of from 0.3 to 2 mg/ml. The solvent used for this purpose is generally a polar aprotic solvent such as dimethyl sulfoxide (DMSO), dimethylformamide (DMF) or dimethylacetamide (DMA), or an apolar solvent such as chloroform or dichloromethane, if the grafted nanoparticles are not dispersible in polar aprotic solvents.

Figure 2A:
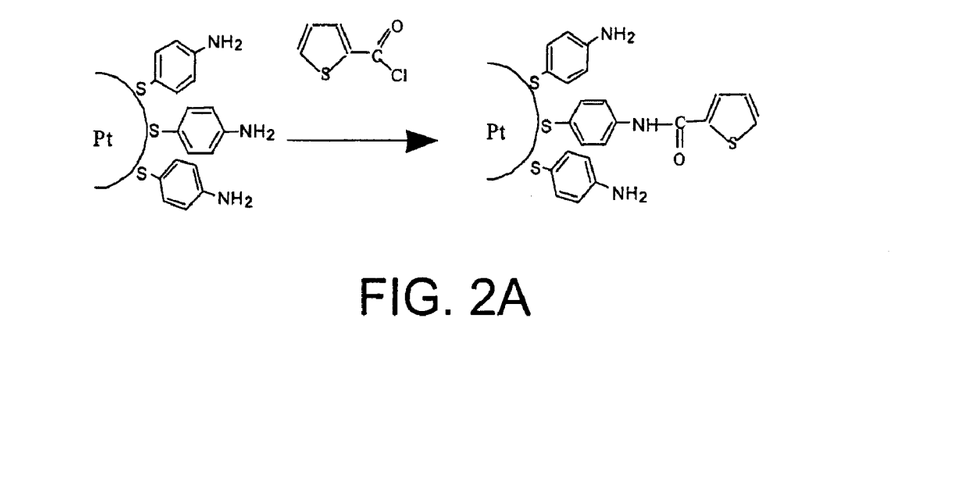
FIGS. 2A, 2B, 2C, 2D, 2E, 2F and 2G schematically illustrate 7 different grafting reactions applied to nanoparticles with a platinum core functionalized with a first coating consisting of 4-mercaptoaniline residues.

More specifically, the grafting reactions illustrated in FIGS. 2A to 2G are performed using:

Grafting Reaction of FIG. 2A:
 Mass of functionalized nanoparticles: 25 mg
 Solvent: DMA: 5 ml
 Grafting compound: thiophene acid chloride: 26 µl (6-fold excess)
 Trapping of HCl: dimethylaminopyridine: 20 mg
 Precipitation/washing solvents: acetonitrile Grafting Reaction of FIG. 2B:
 Mass of functionalized nanoparticles: 18 mg
 Solvent: DMSO: 2 ml
 Grafting compound: glutaric anhydride: 45 mg (10-fold excess)
 Precipitation/washing solvents: acetonitrile Grafting Reaction of FIG. 2C:
 Mass of functionalized nanoparticles: 10 mg
 Solvent: DMA: 2 ml
 Grafting compound: sulfobenzoic anhydride: 29 mg (10-fold excess)
 Evaporation of the DMA
 Washing solvents: acetonitrile Grafting Reaction of FIG. 2D:
 Mass of functionalized nanoparticles: 9 mg
 Solvent: DMSO: 2 ml
 Grafting compound: tetrafluorophthalic anhydride: 15 mg (6-fold excess)
 Precipitation solvent: water
 Washing solvent: acetone Grafting Reaction of FIG. 2E:
 Mass of functionalized nanoparticles: 18 mg
 Solvent: DMSO: 5 ml
 Grafting compound: bromobenzyloxycarbonyloxy-succinimide: 89 mg (10-fold excess)
 Evaporation of the DMSO
 Washing solvent: acetonitrile Grafting Reaction of FIG. 2F:
 Mass of functionalized nanoparticles: 22 mg
 Solvent: DMSO: 4 ml
 Grafting compound: 1-hexyl-4-(4-isothiocyanato-phenyl) bicyclo[2.2.2]octane: 100 mg (10-fold excess)

Precipitation of the product in the reaction medium
Washing solvents: DMSO/acetone Grafting Reaction of FIG. 2G:
 Mass of functionalized nanoparticles: 26 mg
 Solvent: DMSO: 5 ml
 Grafting compound: tetraphenylphthalic
 anhydride: 180 mg (6-fold excess)
 Precipitation solvent: ethanol (4 ml)/diethyl ether (20 ml)
 Redissolution in DMSO (4 ml)
 Reprecipitation in ethanol (4 ml)/diethyl ether (20 ml)
 Washing: diethyl ether.

The grafted nanoparticles thus obtained are used in the examples that follow.

Example 3

Stability Over Time of Suspensions of Functionalized Nanoparticles and of Grafted Nanoparticles The stability over time of suspensions of functionalized or grafted nanoparticles is determined by plotting the compression isotherms, recorded at 20° C. and at the air-water interface of a Langmuir tank, of Langmuir films (floating monolayers) prepared from this suspension, immediately upon preparation (t=0), and then at various stages of its ageing.

The procedure for establishing these isotherms is standard. It consists in preparing, at different times t, a "spreading" suspension by adding 1 ml of chloroform or dichloromethane to 0.5 ml of the suspension whose stability over time it is desired to check. Next, 1.2 ml of the spreading suspension is spread onto the surface of the water contained in a Langmuir tank measuring, for example, 45 cm in length by 6.5 cm in width. The nanoparticles are compressed laterally until a preselected surface pressure is reached, for example of 4 mN/m. The length of the film of nanoparticles thus obtained is measured and its surface area is calculated by multiplying this length by the width of the tank.

Given the mass concentration of nanoparticles of the spreading suspension, the area occupied on average by each mass unit of nanoparticles in the monolayer is determined. On the basis of an estimation of the molar mass of the particles, it is also possible to determine the area occupied on average by each nanoparticle.

If the nanoparticle suspension is stable over time, in the sense that it is not the site of any aggregation of the nanoparticles, then an area per unit of mass of nanoparticles or per nanoparticle that is constant or substantially constant over time is found at the various times t, for the same amount of nanoparticles spread.

In contrast, if the suspension is unstable, then the value of the area per unit of mass of nanoparticles or of the area per nanoparticle decreases over time, since an aggregate formed from several particles actually occupies a smaller surface area than that occupied by the same number of particles present in individualized form.

Table 1 below shows, by way of example, the values of the area occupied on average by each nanoparticle in Langmuir films prepared from two suspensions of nanoparticles in DMSO, the first suspension consisting of functionalized nanoparticles prepared in accordance with Example 1, and the second suspension consisting of nanoparticles grafted by means of the reaction of FIG. 2A, the values shown being those at t=0 and after 1 month (t=1 month) and 7 months (t=7 months) of ageing of the said suspensions.

TABLE 1

| Type of nanoparticles | Area ($Å^2$) at t = 0 | Area ($Å^2$) at t = 1 month | Area ($Å^2$) at t = 7 months |
|---|---|---|---|
| Functionalized particles | 680 | 490 | 0 |
| Grafted particles | 900 | 1000 | 950 |

This table shows that the area per nanoparticle decreases very significantly as the suspension of functionalized nanoparticles ages, reflecting the existence of a phenomenon of aggregation of these nanoparticles, whereas it remains substantially constant in the case of the suspension of grafted nanoparticles.

Figure 3:
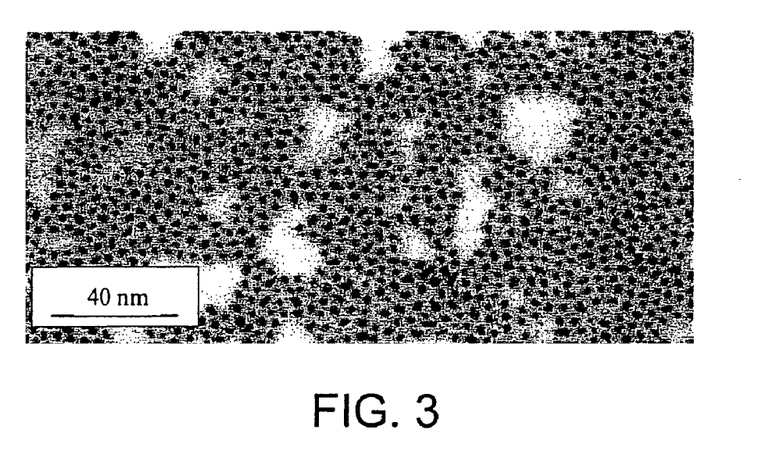
FIG. 3 is a photograph taken with a transmission electron microscope of a Langmuir film made using a two-year-old suspension of nanoparticles grafted by means of the reaction illustrated in FIG. 2A.

Moreover, FIG. 3 is a photograph taken by transmission electron microscope of a Langmuir film made from a two-year-old suspension of nanoparticles grafted by means of the reaction illustrated in FIG. 2A, and taken at the air/water interface of a Langmuir tank. This film was obtained by applying a surface pressure of 4 mN/m.

FIG. 3 shows the absence of nanoparticle aggregates in the film, thus confirming the long-term maintenance of stability of the suspension of grafted nanoparticles.

Example 4

Electrochemical Activity of Grafted Nanoparticles with Respect to the Reduction of Oxygen in Acidic Medium The electrochemical activity of grafted nanoparticles with respect to the reduction of oxygen in acidic medium is assessed by subjecting Langmuir-Blodgett films (monolayers on a support)—referred to hereinbelow as "LB films"—composed of grafted nanoparticles to cyclic voltammetry tests in 1M sulfuric acid solution.

In practice, a spreading suspension is prepared by adding 0.5 ml of a suspension containing 0.5 mg of grafted nanoparticles per ml of DMSO, 0.82 ml of dichloromethane or chloroform, and 0.18 ml of a $5.4 \times 10^{-4}$ M solution of behenic acid in chloroform, this acid being intended to facilitate the vertical transfer of the film of grafted nanoparticles onto the support.

Next, 1 ml of the spreading suspension is spread onto the surface of the water contained in a Langmuir tank (45 cm×6.5 cm) and a film is formed by lateral compression at a surface pressure of 28 mN/m. Under these conditions, the area occupied by the nanoparticles is about 50% of the total area of the film, the remainder being occupied by the behenic acid.

The film is then transferred vertically onto a support, at 0.5 cm/minute, via the Langmuir-Blodgett technique, the support being equipped with a gold electrode.

The voltammetry tests are performed in a conventional manner on the LB films of grafted nanoparticles without prior electrochemical treatment of these films and after saturation with $O_2$ of the acid solution.

Figure 2B:
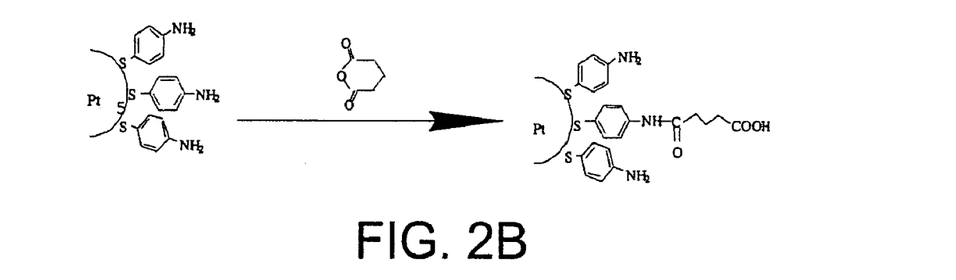
Figure 4:
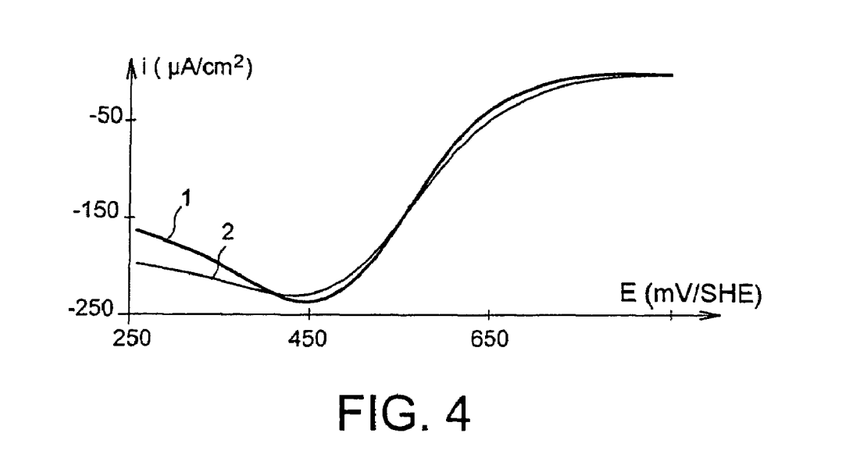
FIG. 4 shows the voltammograms obtained by cyclic voltammetry, in an acidic medium initially saturated with oxygen, for Langmuir-Blodgett films respectively composed of nanoparticles grafted by means of the reactions illustrated in FIGS. 2A and 2B.

By way of example, FIG. 4 shows the voltammograms, recorded at a sweep speed of 20 mV/s, for two different films of grafted nanoparticles, composed, respectively, of nanoparticles grafted by means of the reaction illustrated in FIG. 2A (curve 1) and of nanoparticles grafted by means of the grafting reaction illustrated in FIG. 2B (curve 2). In this figure, the potentials are expressed in mV relative to a standard hydrogen electrode (SHE).

FIG. 4 shows that the electrochemical activities of the two types of grafted nanoparticle are extremely similar, the electrical current density of the reduction peak being, for both films, between 230 and 240 µA/cm². The reduction process disappears when the acid solution is deoxygenated with a stream of nitrogen.

Example 5

Electrochemical Activity of Grafted Nanoparticles with Respect to the Reduction of Oxygen in Basic Medium The electrochemical activity of grafted nanoparticles with respect to the reduction of oxygen in basic medium is assessed by subjecting LB films of grafted nanoparticles, prepared as described in Example 4, to cyclic voltammetry tests performed under the same conditions as those of Example 4, with the exception that the solution used contains not sulfuric acid, but 1M sodium hydroxide.

Figure 2C:
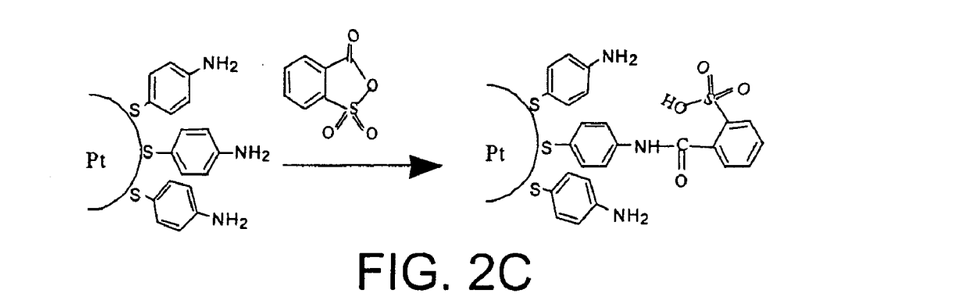
Figure 2D:
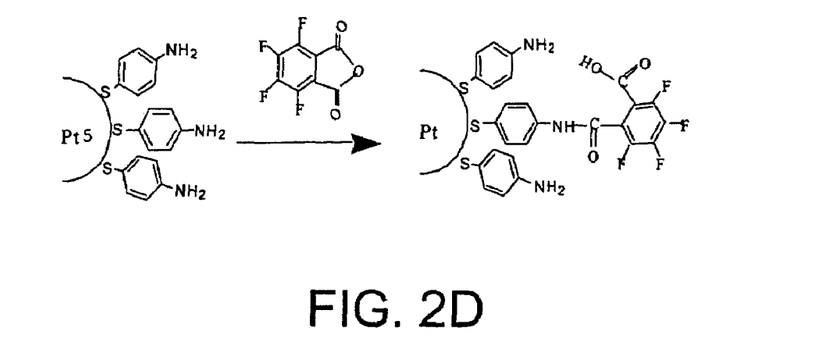
Figure 2E:
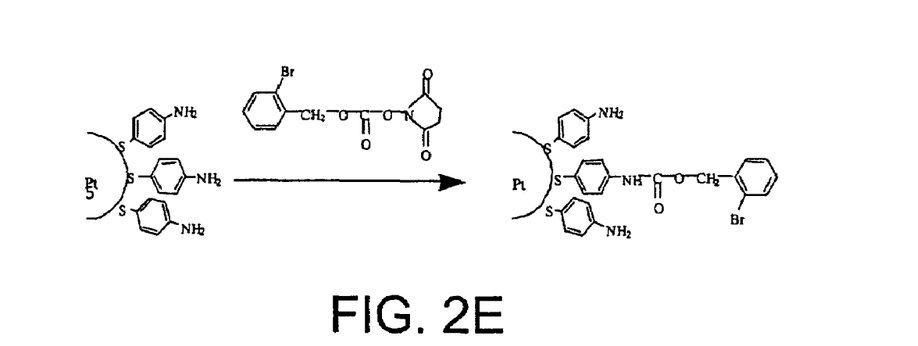
Figure 5:
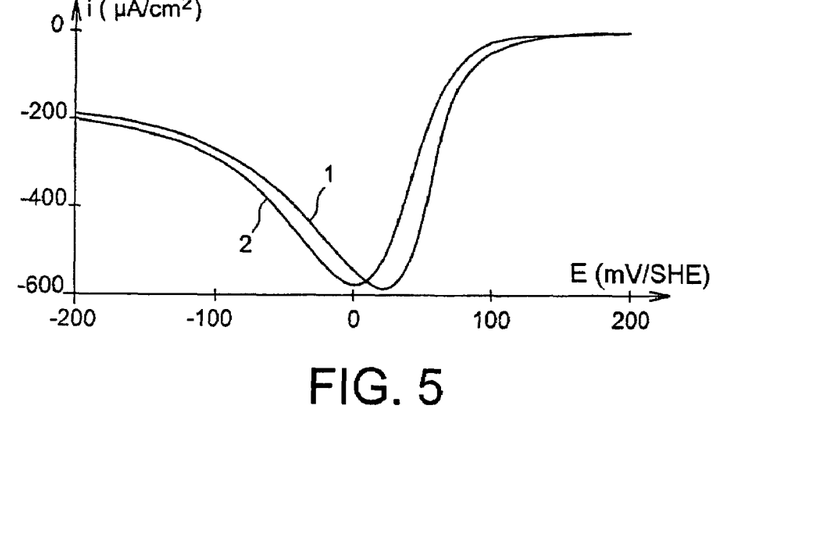
FIG. 5 shows the voltammograms obtained by cyclic voltammetry, in a basic medium that is initially saturated with oxygen, for Langmuir-Blodgett films respectively composed of nanoparticles grafted by means of the reactions illustrated in FIGS. 2C and 2D.

By way of example, FIG. 5 shows the voltammograms, recorded at a sweep speed of 20 mV/s, for two different films of grafted nanoparticles, composed, respectively, of nanoparticles grafted by means of the reaction illustrated in FIG. 2C (curve 1) and of nanoparticles grafted by means of the reaction illustrated in FIG. 2D (curve 2). As previously, the potentials are expressed in this figure in mV relative to a standard hydrogen electrode (SHE). During the first cycles, the electrical current density of the reduction peak is similar to that observed in $H_2SO_4$ medium. When the experiment is continued, this electrical current density increases and then stabilizes at the values shown in FIG. 5.

In this case also, FIG. 5 shows that the electrochemical activities of the two types of grafted nanoparticle are extremely similar, the electrical current density of the reduction peak being, for both films, between 570 and 580 µA/cm. Moreover, the reduction process disappears when the basic solution is deoxygenated with a stream of nitrogen.

Example 6

Electrochemical Activity of Grafted Nanoparticles with Respect to the Oxidation of Hydrogen in Acidic Medium The electrochemical activity of grafted nanoparticles with respect to the oxidation of hydrogen in acidic medium is assessed by subjecting LB films of grafted nanoparticles, prepared as described in Example 4, to cyclic voltammetry tests performed under the same conditions as those of Example 4, with the exception that an acidic solution initially saturated with $H_2$ is used.

Figure 6:
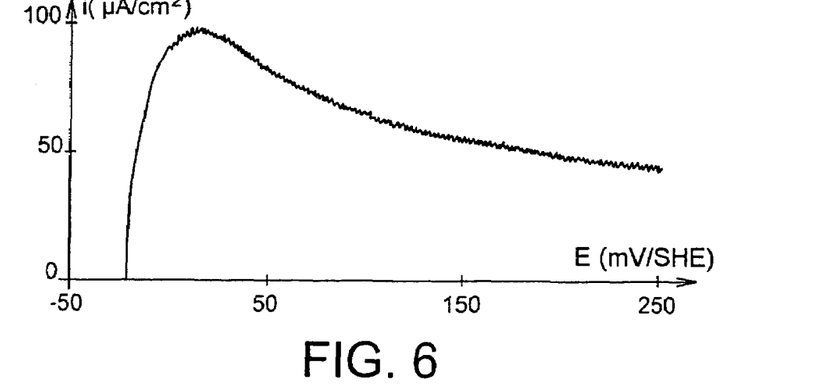
FIG. 6 shows the voltammogram obtained by cyclic voltammetry, in an acidic medium initially saturated with hydrogen, for a Langmuir-Blodgett film composed of nanoparticles grafted by means of the reaction illustrated in FIG. 2A.

By way of example, FIG. 6 shows the voltammogram, recorded at a sweep speed of 20 mV/s, for a film composed of nanoparticles grafted by means of the reaction illustrated in FIG. 2A. As previously, the potentials are expressed in this figure in mV relative to a standard hydrogen electrode (SHE).

Example 7

Stability of the Electrochemical Activity of Grafted Nanoparticles

The stability of the electrochemical activity of grafted nanoparticles with respect to the reduction of oxygen in acidic and basic media is checked by subjecting LB films of grafted nanoparticles, prepared as described in Example 4, to voltammetry tests performed under the same conditions as those of Examples 4 and 5, but, firstly, by varying the age of the suspensions of grafted nanoparticles from which the films are made, and, secondly, by subjecting or not subjecting the said films to electrochemical cycles beforehand.

These electrochemical cycles are performed at a speed of 50 mV/s under an oxygen atmosphere, between 800 and −50 mV/SHE in acidic medium (1M $H_2SO_4$) and between 200 and −850 mV/SHE in basic medium (1M NaOH).

Table 2 below shows the electrical current densities recorded of the oxygen reduction peak, at a sweep speed of 20 mV/s, for films of nanoparticles grafted by means of the reaction illustrated in FIG. 2A.

In this table, the electrical current densities given for sodium hydroxide are those observed after immersing the films in this medium for 30 minutes without polarization.

TABLE 2

| Age of the suspension | Medium | Electrochemical treatment | Electrical current density of the $O_2$ reduction peak (µA/cm²) |
|---|---|---|---|
| 7 days | 1M NaOH | — | 578 |
| 43 months | 1M NaOH | — | 570 |
| 43 months | 1M NaOH | 350 cycles | 575 |
| 25 months | 1M $H_2SO_4$ | — | 237 |
| 25 months | 1M $H_2SO_4$ | 100 cycles | 235 |

Example 8

Stability in Acidic Medium of the Second Organic Coating of Grafted Nanoparticles The stability in acidic medium of the second organic coating of grafted nanoparticles is assessed by subjecting LB films of grafted nanoparticles, prepared as described in Example 4, to prolonged electrochemical cycles, in 1M sulfuric acid solution, and by analysing these films by X-ray induced photoelectron spectroscopy before and after these cycles.

In this experiment, the electrochemical cycles are performed at a speed of 50 mV/s under an oxygen atmosphere, and between 800 and −50 mV/SHE.

Figure 7A:
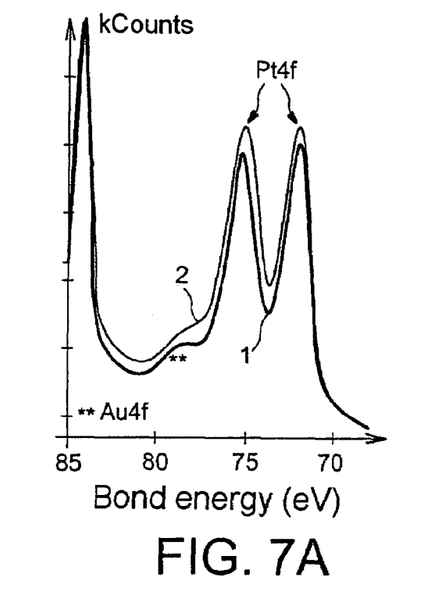
FIGS. 7A and 7B show the spectra obtained by X-ray induced photoelectron spectroscopy for a Langmuir-Blodgett film composed of nanoparticles grafted by means of the reaction illustrated in FIG. 2A, before and after applying to this film prolonged electrochemical cycles in acidic medium.
Figure 7B:
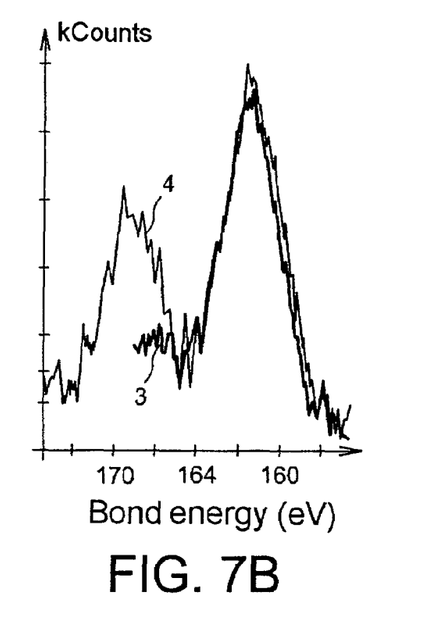

By way of example, FIGS. 7A and 7B show the spectra recorded for films of nanoparticles grafted by means of the reaction illustrated in FIG. 2A. FIG. 7A concerns the 4f electrons of platinum, while FIG. 7B concerns the s2p electrons of sulfur.

The shapes of the spectra obtained before (spectra 1 and 3) and after (spectra 2 and 4) the cycles, respectively, show remarkable similarity for each type of electron, which is evidence of the noteworthy stability of the second organic coating.

For sulfur, the peak centred at 163 eV corresponds to the second organic coating of the nanoparticles, while the peak centred at 169 eV corresponds to the sulfate ions inserted into the films.

Moreover, the semi-quantitative analyses derived from these characterizations before and after treatment of the films in acidic medium made it possible to show that the ratio between the intensities of the platinum peaks and of the sulfur peaks of the second organic coating do not change significantly (1.72 after the cycles versus 1.44 before the cycles), thus providing evidence of the noteworthy stability of the overall composition of the nanoparticles.

Example 9

Figure 2F:
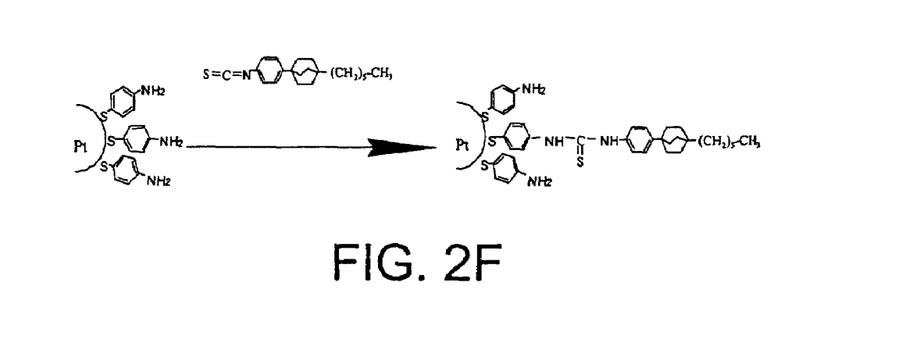

Importance of the Characteristics of the Molecules of the Second Organic Coating on the Electrochemical Activity of Grafted Nanoparticles LB films of nanoparticles grafted by means of the reaction illustrated in FIG. 2F, prepared as described in Example 4, are subjected to cyclic voltammetry tests in acidic medium (1M $H_2SO_4$) under the same conditions as those described in Example 4, with or without polarization of these films.

Figure 8:
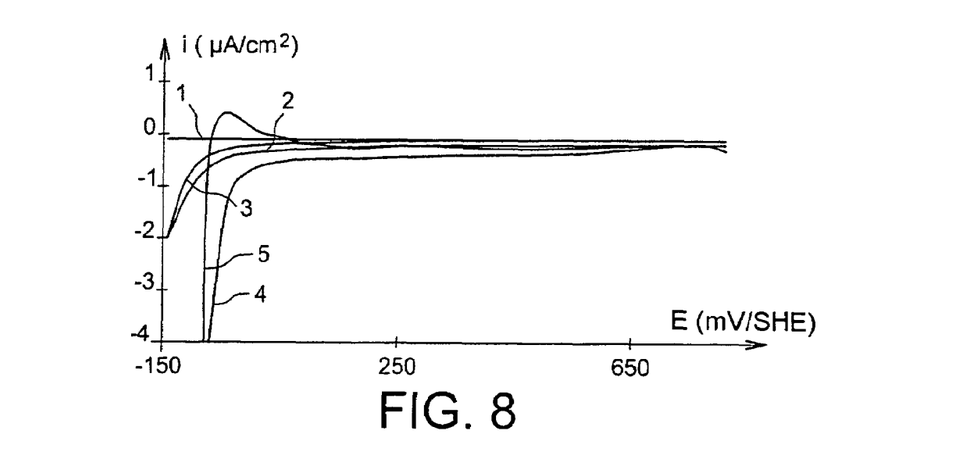
FIG. 8 shows the voltammograms obtained by cyclic voltammetry, in an acidic medium that is initially saturated with oxygen, for Langmuir-Blodgett films composed of nanoparticles grafted by means of the reaction illustrated in FIG. 2F, with and without polarization of these films.

The results are illustrated in FIG. 8, which shows the voltammograms, recorded at a sweep speed of 20 mV/s, for an unpolarized film (curve 1), for films polarized for 30 seconds at 1.95 V/SHE (curves 2 and 3) and for films polarized for 15 minutes at 1.95 V/SHE (curves 4 and 5). As previously, the potentials are expressed in this figure in mV relative to a standard hydrogen electrode (SHE).

This figure demonstrates the importance of the choice of the molecules forming the second organic coating of the nanoparticles on their catalytic activity.

The reason for this is that, in the case of nanoparticles grafted by means of the reaction illustrated in FIG. 2F, since the essential part of the molecules of the second organic coating consists of C—C bonds of $Sp^3$ type, it opposes the expression of catalytic properties by the nanoparticles. These nanoparticles therefore show no electrochemical activity in the absence of a pretreatment, as evidenced by curve 1 of FIG. 8, in contrast with the nanoparticles grafted by means of the reactions illustrated in FIGS. 2A to 2E (see especially Examples 4 to 6).

On the other hand, when the monolayers of nanoparticles grafted by means of the reaction illustrated in FIG. 2F are subjected to high oxidation potentials, an electrochemical response appears, which is proportionately more pronounced the longer the time for which the oxidation potential is applied, and which provides evidence of degradation of the molecules of the second organic coating of the nanoparticles by these oxidation potentials.

Example 10

Figure 2G:
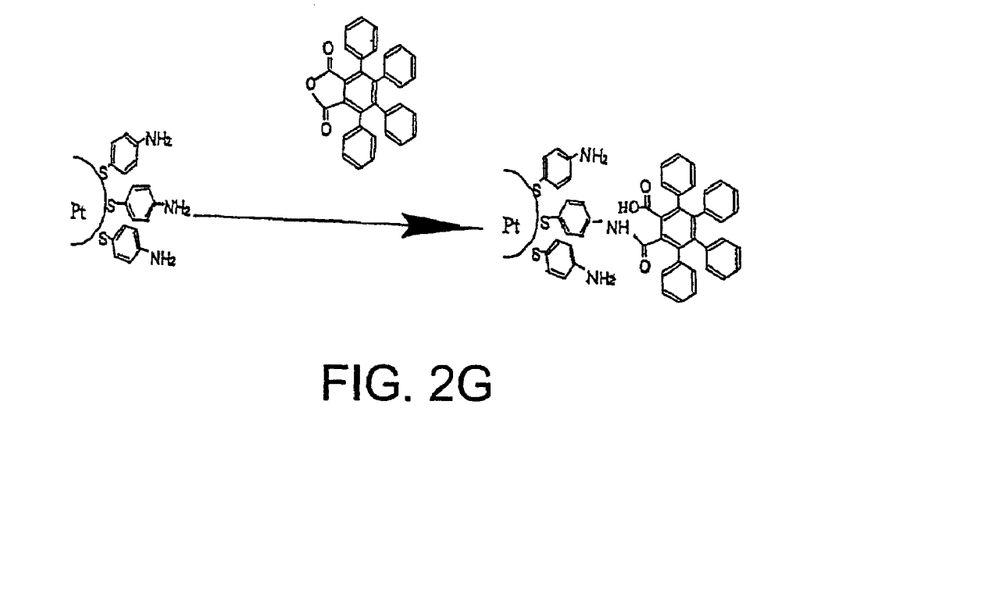

Modulation of the Electrochemical Activity of Grafted Nanoparticles by Means of the Choice of the Second Organic Coating LB films composed, respectively, of nanoparticles grafted by means of the reactions illustrated in FIGS. 2F, 2A and 2G, and prepared as described in Example 4, are subjected to cyclic voltammetry tests in acidic medium (1M $H_2SO_4$) under the same conditions as those of Example 4.

Figure 9:
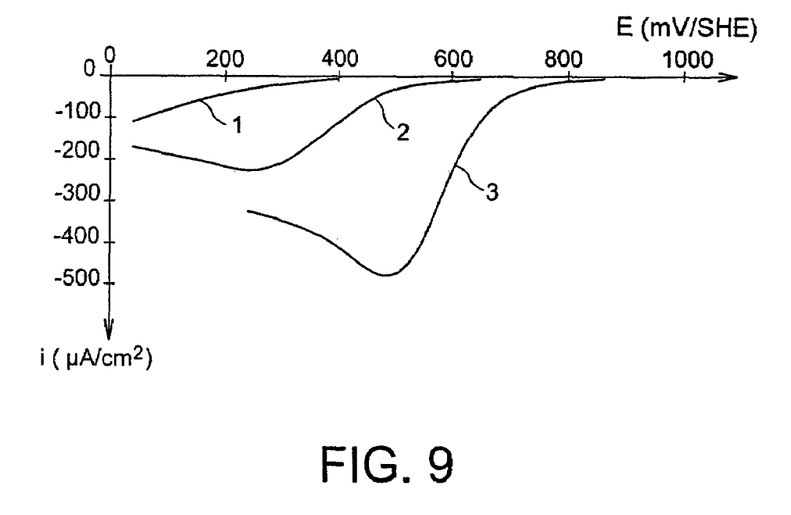
FIG. 9 shows the voltammograms obtained by cyclic voltammetry, in an acidic medium initially saturated with oxygen, for Langmuir-Blodgett films respectively composed of nanoparticles grafted by means of the reactions illustrated in FIGS. 2F, 2A and 2G.

The results are presented in FIG. 9, which shows the voltammograms, recorded at a sweep speed of 20 mV/s, for a film of nanoparticles grafted by means of the reaction illustrated in FIG. 2F (curve 1), for a film of nanoparticles grafted by means of the reaction illustrated in FIG. 2A (curve 2) and for a film of nanoparticles grafted by means of the reaction illustrated in FIG. 2G (curve 3). In this case also, the potentials are expressed relative to a standard hydrogen electrode (SHE).

As may be seen in FIG. 9, no significant electrochemical activity is observed in the case of the nanoparticles grafted by means of the reaction illustrated in FIG. 2F—which is in agreement with the results presented in Example 9—whereas the nanoparticles grafted by means of the reaction illustrated in FIG. 2G show markedly higher electrochemical activity than that of the nanoparticles grafted by means of the reaction illustrated in FIG. 2A, which, nevertheless, are already highly efficient.

These results thus confirm the importance of the choice of the molecules forming the second organic coating on the electrochemical properties of the nanoparticles and the fact that it is possible, in accordance with the invention, to adapt, if so desired, the catalytic performance of the nanoparticles to a desired level, as a function of the use for which they are more particularly intended, by modifying the choice of molecules of the second organic coating.

Example 11

Influence of a Treatment in Basic Medium on Electrochemical Performance of Grafted Nanoparticles The influence of a treatment in basic medium on the electrochemical performance of grafted nanoparticles is assessed by comparing the electrochemical activities observed, respectively, in basic medium (1M NaOH) and in acidic medium (1M $H_2SO_4$) for LB films of nanoparticles grafted by means of the reaction illustrated in FIG. 2A, before and after a treatment consisting in immersing these films of nanoparticles for 30 minutes in sodium hydroxide in the presence of oxygen.

The electrochemical activities are evaluated by means of cyclic voltammetry tests performed on LB films prepared from the said nanoparticles as described in Example 4, the tests in basic medium being performed under the same conditions as those of Example 5, while the tests in acidic medium are performed under the same conditions as those of Example 4.

Figure 10:
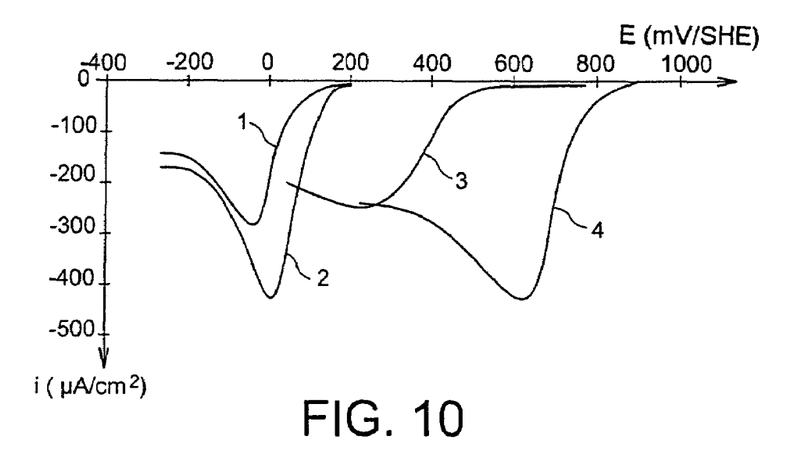
FIG. 10 shows the voltammograms obtained by cyclic voltammetry in basic medium and in acidic medium initially saturated with oxygen, for Langmuir-Blodgett films composed of nanoparticles grafted by means of the reaction illustrated in FIG. 2A, before and after treating these nanoparticles in basic medium, respectively.

The results are presented in FIG. 10, which shows:
- curve 1: the voltammogram obtained in basic medium for a film of nanoparticles before immersion for 30 minutes in sodium hydroxide,
- curve 2: the voltammogram obtained in basic medium for a film of nanoparticles after immersion for 30 minutes in sodium hydroxide,
- curve 3: the voltammogram obtained in acidic medium for a film of nanoparticles before immersion for 30 minutes in sodium hydroxide, and
- curve 4: the voltammogram obtained in acidic medium for a film of nanoparticles after immersion for 30 minutes in sodium hydroxide, all these voltammograms being recorded at a sweep speed of 20 mV/s.

This figure shows that a pretreatment in basic medium of the grafted nanoparticles, for instance immersion in a bath of sodium hydroxide, has the effect of very significantly increasing their electrochemical activity not only in basic medium, but also in acidic medium in which this increase is even more pronounced.

It results therefrom that such a treatment may be used advantageously to improve, if so desired, the catalytic properties of grafted nanoparticles that are immediately active in acidic medium, but whose catalytic performance does not appear to be spontaneously optimal in this medium.

BIBLIOGRAPHY

[1] U.S. Pat. No. 6,462,095
[2] M. M. Maye, Y. Lou, C. J. Zhong, Langmuir, 2000, 16, 7520-7523
[3] Y. Lou, M. M. Maye, L. Han, J. Luo, C. J. Zhong, *Chem. Commun.*, 2001, 473-474

[4] J. Luo, M. M. Maye, Y. Lou, L. Han, M. Hepel, C. J. Zhong, *Catalysis Today,* 2000, 2790, 1-12
[5] FR-A-2 783 051
[6] C. Bureau et al., *Macromolecules,* 1997, 30, 333
[7] C. Bureau et al., *Journal of Adhesion,* 1996, 58, 101
[8] C. Bureau and J. Delhalle, *Journal of Surface Analysis,* 1999, 6(2), 159
[9] L. Geniès, R. Faure, R. Durand, *Electrochimica Acta,* 1998, 44, 1317-1327

The invention claimed is:

1. Catalyst consisting of nanoparticles, said nanoparticles comprising:
    a metal core containing at least one platinoid or an alloy of a platinoid,
    a first organic coating formed from molecules attached to the surface of the metal core, and
    a second organic coating formed from molecules different from the molecules of the first organic coating, and which are grafted onto molecules of the first organic coating,
    wherein the molecules of the second organic coating are residues of a compound chosen from monocyclic and polycyclic anhydrides.

2. Catalyst according to claim 1, in which the metal core of the nanoparticles consists of platinum, a platinum alloy or a mixture of the two.

3. Catalyst according to claim 1 or claim 2, in which the molecules of the first organic coating are residues of compounds comprising at least two chemical functions including a first function for attaching them to the surface of the metal core, and a second function for grafting them with the molecules of the second organic coating.

4. Catalyst according to claim 1, in which the molecules of the first organic coating are capable of degrading at the surface of the metal core when they are not grafted with molecules of the second organic coating.

5. Catalyst according to claim 4, in which the molecules of the first organic coating are 4-mercaptoaniline residues.

6. Catalyst according to claim 1, in which the proportion of molecules of the first organic coating onto which are grafted the molecules of the second organic coating is less than 100%.

7. Catalyst according to claim 1, in which the thickness formed by the two organic coatings does not exceed about 10 nm.

8. Catalyst according to claim 1, in which the molecules of the second organic coating are residues of compounds chosen from glutaric anhydride, sulfobenzoic anhydride, diphenic anhydride, tetrafluorophthalic anhydride, tetraphenylphthalic anhydride and diphenylmaleic anhydride.

9. Catalyst according to claim 1, in which the nanoparticles are from about 1.5 to 10 nm in diameter.

10. Catalyst according to claim 9, in which the nanoparticles are from about 1.5 to 5 nm in diameter.

11. Catalyst according to claim 1, wherein the catalyst is in suspension in a solvent.

12. Catalyst according to claim 11, in which the suspension has a nanoparticle concentration of from 0.3 to 1 mg/ml.

13. Catalyst according to claim 1, in which the nanoparticles are in the form of a film, deposited onto the surface of a support.

14. Catalyst according to claim 13, in which the support is a carbon nanotube.

15. Catalyst according to claim 1, in which the nanoparticles immersed in a basic medium before use.

16. Catalyst according to claim 15, in which the nanoparticles are immersed in a solution of a strong base.

17. Catalyst according to claim 1, wherein the catalyst is an electrocatalyst.

18. Catalyst according to claim 17, wherein the catalyst is used in a device for producing electrical energy.

19. Catalyst according to claim 18, wherein the catalyst is used in a fuel cell.

20. Catalyst according to claim 17, wherein the catalyst is used in a system for detecting or assaying one or more chemical or biological species.

21. Catalyst according to claim 20, wherein the catalyst is used in a sensor or a multisensor.

22. Device for producing electrical energy, wherein the device comprises the catalyst as defined in claim 1.

23. Device according to claim 22, wherein the device is a fuel cell.

24. Nanoparticle comprising:
    a metal core containing at least one platinoid or an alloy of a platinoid,
    a first organic coating formed from molecules attached to the surface of the metal core, and
    a second organic coating formed from molecules different from the molecules of the first organic coating, and which are grafted onto molecules of the first organic coating, in which the molecules of the second organic coating are residues of a compound chosen from monocyclic and polycyclic anhydrides.

25. Nanoparticle according to claim 24, in which the molecules forming the second organic coating are residues of a compound chosen from glutaric anhydride, sulfobenzoic anhydride, diphenic anhydride, tetrafluorophthalic anhydride, tetraphenylphthalic anhydride and diphenylmaleic anhydride.

26. Nanoparticle according to claim 24, in which the metal core consists of platinum, a platinum alloy or a mixture of the two.

27. Nanoparticle according to claim 24, in which the molecules of the first organic coating are 4-mercaptoaniline residues.

28. Nanoparticle according to claim 24, wherein the nanoparticle is from about 1.5 to 10 nm in diameter.

29. Nanoparticle according to claim 28, wherein the nanoparticle is from about 1.5 to 5 nm in diameter.

* * * * *